A. McDANNOLD.
ELECTRIC SWITCH.
APPLICATION FILED MAR. 15, 1920. RENEWED APR. 29, 1921.
1,391,782.
Patented Sept. 27, 1921.
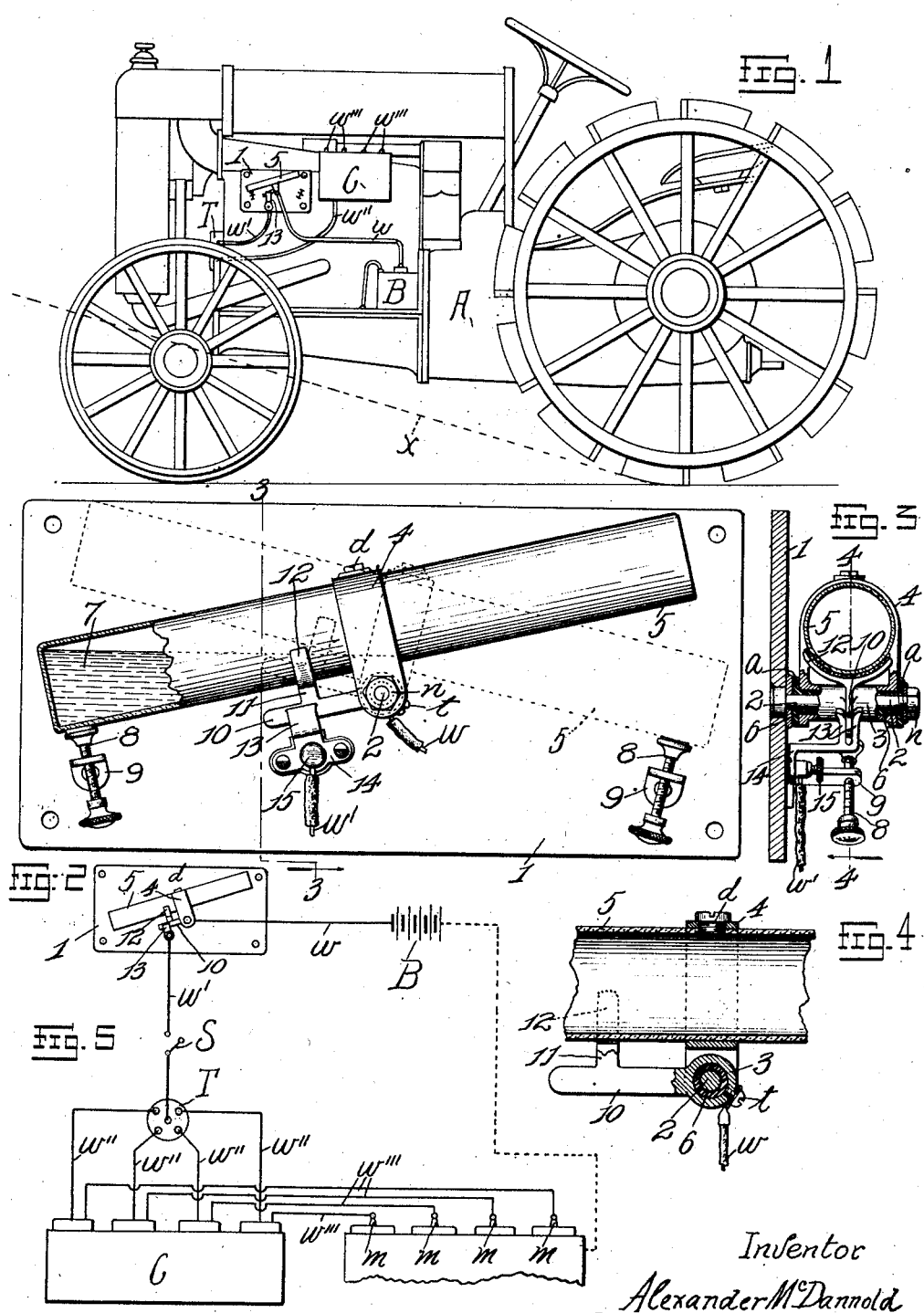
Inventor
Alexander McDannold
by Emil Starek Atty

UNITED STATES PATENT OFFICE.

ALEXANDER McDANNOLD, OF HALLANDALE, FLORIDA.

ELECTRIC SWITCH.

1,391,782.  Specification of Letters Patent.  Patented Sept. 27, 1921.

Application filed March 15, 1920, Serial No. 366,019. Renewed April 29, 1921. Serial No. 465,499.

*To all whom it may concern:*

Be it known that I, ALEXANDER McDANNOLD, a citizen of the United States, residing at Hallandale, in the county of Broward and State of Florida, have invented certain new and useful Improvements in Electric Switches, of which the following is a full, clear, and exact description, reference being had to the accompanying drawings, forming a part hereof.

The present invention is directed to improvements in automatic switches for the spark-plug circuits of internal combustion engines as applied to self-propelled vehicles generally, but tractors more particularly, the object of the invention being to stop the engine or motor under conditions when for any reason there is danger of the tractor rearing and turning over about the axis of the rear wheels. It is well known that where a plow is attached to a tractor and the plow-share encounters a stump or other obstruction which suddenly arrests the forward travel of the vehicle, the continued operation of the driving gear will cause the body of the tractor to "wind" or rear about the axis of the rear wheels, rotation of the latter being arrested under the circumstances by the stoppage of the vehicle. In this rearing movement of the vehicle the driver often loses his head so that he fails either to stop the motor or unclutch the running gear therefrom at the critical moment and before the vehicle overturns. The result is that the driver is often injured or killed by the machine rolling on top of him. To avoid such consequences is the purpose of the present improvement, the motor being stopped by the automatic opening of the circuit leading from the battery to the timer and spark plugs, this automatic breaking of the circuit being accomplished by a special construction of switch to be now described in detail in connection with the accompanying drawings in which—

Figure 1 represents a side elevation of a tractor showing my invention applied thereto; Fig. 2 is an enlarged side elevation of the improved switch in normal position; Fig. 3 is a vertical cross-section on the line 3—3 of Fig. 2; Fig. 4 is a vertical longitudinal sectional detail on the line 4—4 of Fig. 3; and Fig. 5 is a diagram showing the conventional wiring system in this class of vehicles.

Referring to the drawings, A, represents a conventional tractor to which any agricultural implement such as a plow (not shown) may be attached. It frequently happens that in plowing, the shares of the plow encounter an obstruction such as a stump or rock, bringing the machine suddenly to a stop; and since under the circumstances the rear wheels of the tractor can not turn, the entire machine starts to revolve about the axis of said wheels, the front wheels leaving the ground and the entire tractor rearing so as to assume an incline as indicated by the dotted line $x$ in Fig. 1. If the rearing continues the machine will simply overturn and may do serious injury to the driver unless he has presence of mind to stop the engine. By my improvement this is brought about automatically. The body of the tractor is provided with a plate 1 from the center of which projects a cylindrical bolt or spindle 2 about which is free to rotate the sleeve 3 of a yoke or strap 4 secured about the walls of a hollow cylinder or tubular container 5, the sleeve being provided with an insulating bushing 6 terminating in flanges $a$ which likewise insulate the band 4 from the plate 1 and from the nut $n$ carried by the threaded end of the bolt. No claim is made for the insulation as this falls within the purview of the skilled mechanic. The tube 5 is disposed symmetrically about the axis of the spindle 2, and since the bushing 6 is loose on the spindle it leaves the tube free to oscillate in a vertical plane about the axis of the spindle. The tube is closed at the ends and contains a body of fluent material 7 which may be mercury or its equivalent (as for example steel balls or the like). When the mercury is at one end of the tube the weighted end of the tube is caused to rest on an adjustable screw bearing 8 carried by an angle bracket 9; and when the mercury is caused to run to the opposite end of the tube it oscillates the latter until it is arrested by the screw bearing 8 carried by the angle bracket 9 at the opposite end of the plate 1, the bearings 8, 8, being so set that when the tube engages either one of them the tube will be slightly inclined, the degree of inclination depending on the adjustment imparted to said screws.

Leading from the sleeve 3 toward the front end of the machine is an arm 10 which is disposed parallel to the axis of the tube 5, and is rigidly connected to the tube by a strut 11 terminating in arms 12 which partly embrace the tube, said strut 11 being disposed a suitable distance from the free end of the arm 10. The arm 10 may be designated as the switch arm since with the oscillations of the tube 5 said arm makes and breaks the circuit which supplies the current to the spark plugs. As shown in the diagram in Fig. 5, the battery B has one of its terminals grounded, the opposite terminal having leading therefrom a wire $w$ which is connected by a screw $t$ to the sleeve 3 (Fig. 4), the current being conducted through the arm 10 to the wipers 13 between which it is received when the tube 5 tilts forward (Figs. 1, 2,) said wipers forming the terminals of a conducting bracket 14 secured to but insulated from the plate 1. A binding post 15 on the bracket 14 secures the adjacent end of a wire $w'$ leading to the timer T, a suitable hand switch S being placed in the path of said wire. From the timer T lead the wires $w''$ to the coil box C, whence lead the wires $w'''$ to the spark plugs $m$, the grounding of the current being shown by the dotted line in Fig. 5. The wiring is herein shown more or less conventionally, being well understood in the art and requiring no further description.

The operation is obvious from Figs. 1 and 2, but briefly put is as follows: When the tractor travels on a level or on a grade insufficient to shift the mercury 7 from the front end of the tubular container 5 to the rear end, the front weighted end of the tube 5 keeps the switch 10 in contact with the wipers 13 and the current continues to flow to the spark plugs and keeps the engine running. The moment however that the tractor begins to rear and assumes an angle or tilt (see line $x$ Fig. 1) sufficient to spill or shift the mercury 7 to the rear end of the tube, the tube oscillates to the dotted position in Fig. 1, throwing the switch 10 out of engagement with the wipers 13 and breaking the circuit. This of course stops the engine and the tractor comes to a stop and settles down to rest on all four wheels. Thereupon the tube 5 is set by hand back to its original position, when again the circuit is closed and the machine may resume its work. The screws 8, 8, may of course be adjusted to any desired degree so as to impart any desired tilt or inclination to the tube 5. Any suitable fluent material may be confined in the tube. Mercury is perhaps the most sensitive. Balls however might well answer the purpose. The tube 5 is provided with a screw-plug $d$ upon the removal of which the mercury (or its equivalent) may be poured into the tube. Any other arrangement for introducing the mercury into the tube may be substituted for that here shown.

Having described my invention what I claim is—

An electric switch comprising a tube hinged at an intermediate point about an axis exterior to the tube to oscillate in a vertical plane, a longitudinally disposed insulated switch arm projecting from said axis parallel to the tube and participating in the oscillations of the tube, fluent contents in the tube gravitating toward one end of the tube and keeping the same weighted at said end, an adjustable bearing against which the weighted end of the tube may rest, and a second adjustable bearing for engaging the opposite end of the tube with a tilting of the tube in the opposite direction due to the shifting of the fluent mass toward said end with a change in the angular position of the tube.

In testimony whereof I affix my signature, in presence of two witnesses.

ALEXANDER McDANNOLD.

Witnesses:
 MILDRED ROMFH,
 E. HUGHES.